United States Patent [19]

Yoshio et al.

[11] 3,858,799

[45] Jan. 7, 1975

[54] CONTROL SYSTEM FOR TRANSFER OF KEY INPUT DATA IN TABLE-TYPE ELECTRONIC COMPUTER

[75] Inventors: Ozawa Yoshio; Mitsui Hidetsugu, both of Tokyo, Japan

[73] Assignee: Ricoh Co., Ltd., Tokyo, Japan

[22] Filed: July 13, 1973

[21] Appl. No.: 378,805

[30] Foreign Application Priority Data

July 14, 1972 Japan ..................... 47-70635

[52] U.S. Cl. .................... 235/156, 340/172.5

[51] Int. Cl. .................... G06f 3/00, G06f 13/00

[58] Field of Search ......... 235/156, 165; 340/172.5, 340/173 RC

[56] References Cited

UNITED STATES PATENTS

| | | | |
|---|---|---|---|
| 3,629,857 | 12/1971 | Faber | 340/172.5 |
| 3,636,519 | 1/1972 | Heath | 340/172.5 |
| 3,748,652 | 7/1973 | Ward et al. | 340/173 RC |

OTHER PUBLICATIONS

M. C. Dales, Jr. & J. V. Mizzi, "First-in, First-out Buffer Controls," IBM Tech. Disclosure Bulletin, Mar. 1967, pp. 1334–1335.

*Primary Examiner*—Malcolm A. Morrison
*Assistant Examiner*—David H. Malzahn
*Attorney, Agent, or Firm*—Cooper, Dunham, Clark, Griffin & Moran

[57] ABSTRACT

A control system for a table-type electronic computer with a printer is disclosed which enables the entry of key input data while the printer prints out the result of arithmetic operation or the arithmetic unit performs the arithmetic operations. A plurality of series-connected circulating dynamic shift registers are interconnected between the arithmetic unit and the key input section so that the input data may be sequentially transferred from the first shift register to the last shift register under the control of control means which controls a plurality of gate means in response to the signals from self-holding circuits associated with the shift registers, respectively, for detecting whether the input data is stored or not in the associated shift registers. In response to a "NOT BUSY" signal from the arithmetic unit or printer the input data stored in the buffer stage are sequentially transferred into the arithmetic unit.

8 Claims, 3 Drawing Figures

CONTROL SYSTEM FOR TRANSFER OF KEY INPUT DATA IN TABLE-TYPE ELECTRONIC COMPUTER

BACKGROUND AND SUMMARY OF THE INVENTION

The present invention relates to a control system for transfer of key input data in a table-type electronic computer, and more particularly a control system enabling the entry of input data by depressing entry keys independently of the operations of the arithmetic unit and printer.

Table type electronic computers have almost displaced the mechanical calculators because of their various advantages such as simple operation, fast computing time, low cost and so on, and have been used widely in many fields. In general digits and instructions are sequentially entered by a key input section or keyboard so that the input data may be processed according to the instructions and the result may be displayed by a suitable electronic display device. The next input data cannot be entered during the operating time of the arithmetic unit or display device, but there is no inconvenience in practice because the speed with which the input data are entered manually is far slower than the speed of the arithmetic unit or electronic display device. In other words the input data may be continuously entered in case of the table-type electronic computers with an electronic display device.

However the table-type computers which are used in shops or the like are generally provided with a printer instead of an electronic display device in order to issue receipts for customers. In the table-type computers with a printer, the operating time which is the computing time plus printing time becomes considerably longer than that of the table-type computers with an electronic display device because of the mechanical operation of a printer. It becomes therefore impossible to enter input data while the printer is printing. Furthermore when the input data are entered while the printer is printing, they are key-locked, an error signal is generated or the desired input data are cut, thus resulting in erroneous operation.

One of the objects of the present invention is therefore to provide a control system for a table-type computer especially with a printer for enabling the entry and storage of input data even while the arithmetic unit and the printer are performing their functions.

Another object of the present invention is to provide a control system for a table-type computer of the type in which the input data transmitted from the key input section or keyboard are stored in a buffer section and then sequentially transferred into the arithmetic unit upon completion of the arithmetic and printing operation.

Another object of the present invention is to provide a control system for a table-type computer which may reduce to the minimum the storage capacity of the buffer section inserted between the key input section and the arithmetic unit.

According to one embodiment of the present invention there are provided a plurality of series-connected circulating dynamic shift registers for storing the input data from a key input section and a plurality of self-holding circuits associated with the shift registers, respectively, for detecting and giving signals indicating whether the input data are stored in the associated shift registers. The shift registers are connected in series through gate circuits, and the first shift register is coupled to the key input section whereas the last shift register, to the arithmetic unit. The gate circuits are controlled in response to the output signals from the self-holding circuits in such a manner that the input data from the key input section may be sequentially transferred from the first shift register to the last shift register. Independently of the input data storage operation, but in synchronism with the operating cycle of the arithmetic unit and the printer the input data are sequentially transferred into the arithmetic unit from the shaft register.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
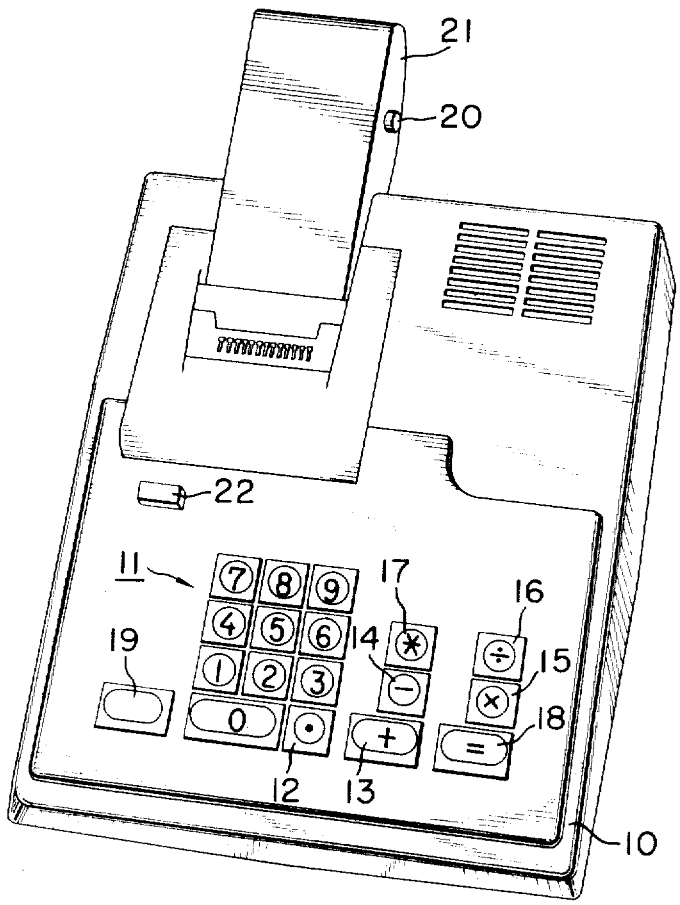
FIG. 1 is a perspective view of a table-type electronic computer with a printer.

Referring to FIG. 1 illustrating a table-type computer with a printer, ten digit keys 11 and a decimal point key 12 are arrayed at the center of a casing 10, and an addition key 13, a subtraction key 14, a multiplication key 15, a division key 16, a total key 17 and an equal key 18 are arrayed in two columns on the right side of the keyboard of the casing 10. A clear key 10 is positioned on the left side of the "0" digit key. The above keys 11 – 19 are entry keys. The results of the operations are sequentially printed upon a rolled paper 21 carried by a shaft 20 and advanced by a predetermined length whenever a paper feed key 22 is depressed. In the table-type computer of the type described, the operating time is generally dependent upon the speed of the printer, and when the printer is actuated no data can be entered.

Figure 2:
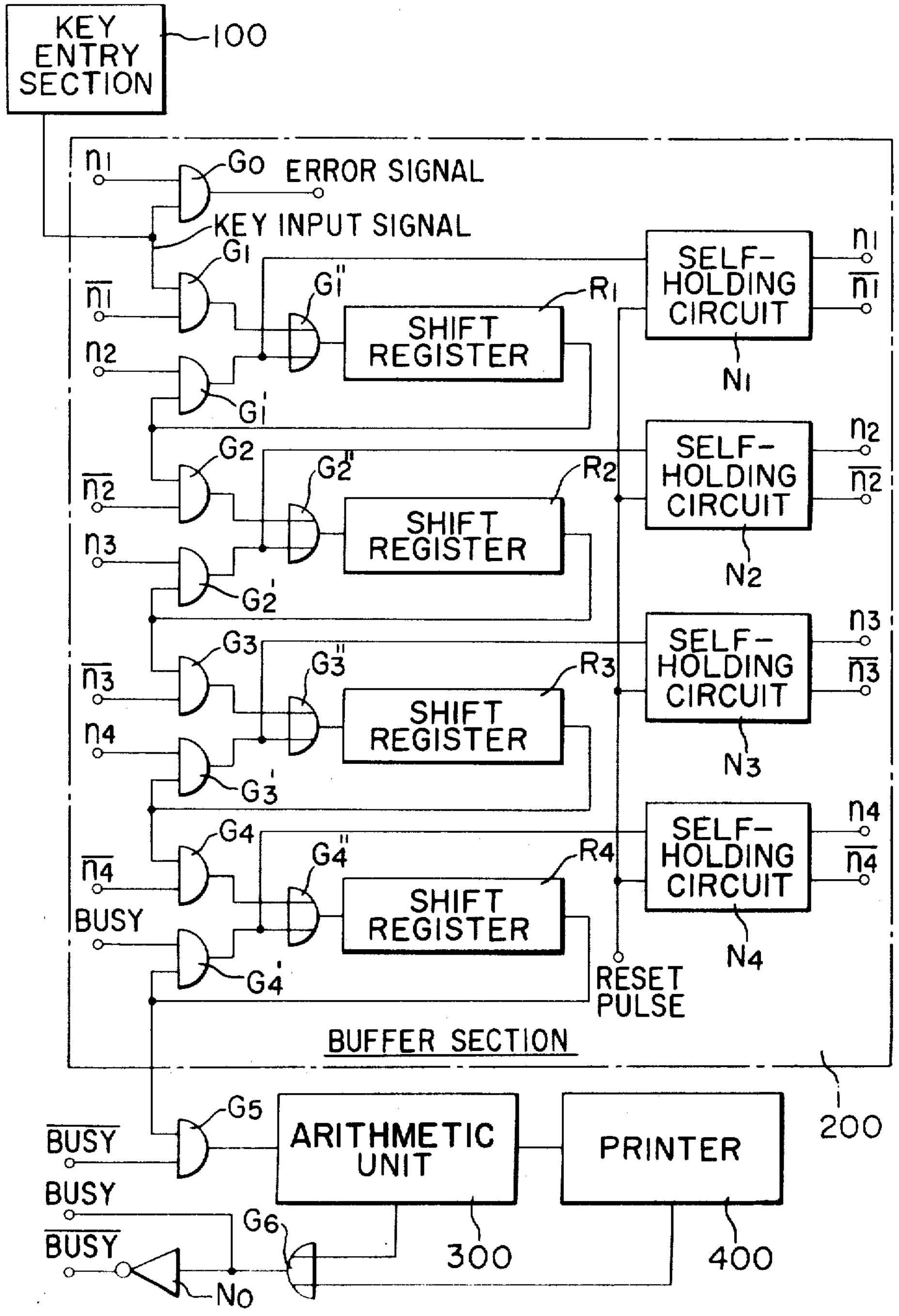
FIG. 2 is a block diagram of a buffer control system in accordance with the present invention.

This shortcoming of a table-type computer with a printer may be overcome by the present invention. Referring to FIG. 2, reference numeral 100 denotes a key entry section; 300, an arithmetic unit or section; and 400, a printer, and the key entry section 100, the arithmetic unit 300 and the printer 400 may be similar in construction and mode of operation to those of the conventional table-type computers so that no detailed description will be made in this specification. A buffer section generally designated by 200 is inserted between the key entry section 100 and the arithmetic unit 300, and includes four circulating dynamic shift registers $R_1$, $R_2$, $R_3$ and $R_4$ each with the storage capacity of one word. A numeral signal of one word and an instruction signal are transferred into the shift register $R_1$ through an AND gate $G_1$ and an OR gate $G''_1$. The shift register $R_1$ is coupled through an AND gate $G_2$ and an OR gate $G''_2$ to the shift register $R_2$. In like manner, the shift register $R_2$ is coupled through an AND gate $G_3$ and an Or gate $G''_3$ to the shift register $R_3$ which in turn is coupled through an AND gate $G_4$ and an OR gate $G''_4$ to the shift register $R_4$. AND gates $G'_1$, $G'_2$, $G'_3$ and $G'_4$ are provided in order to permit the recirculation of the contents of the shift registers $R_1 - R_4$, respectively. Self-holding circuits $N_1$, $N_2$, $N_3$ and $N_4$ comprise flip-flops, and there is established one-to-one correspondence between the self-holding circuits $N_1 - N_4$ and the shift registers $R_1 - R_4$. For example the self-holding circuit $N_1$ is adapted to indicate whether the key input signal is stored in the shift register $R_1$ or not, and outputs the signal $n_1$ when the input signal is stored in the shift register $R_1$ but outputs the signal $\overline{n}_1$ when no input signal is stored. The same is true for the other self-holding circuits $N_2$, $N_3$ and $N_4$. The self-holding circuits $N_1$, $N_2$, $N_3$ and $N_4$ are reset in response to reset pulses.

Assume that no signal is stored in the shift registers $R_1$, $R_2$, $R_3$ and $R_4$ so that the negative signals $\overline{n}_1$, $\overline{n}_2$, $\overline{n}_3$ and $\overline{n}_4$ are derived from the self-holding circuits $N_1$, $N_2$, $N_3$ and $N_4$, respectively. When the first key input signal is applied to the buffer section 200, it is transferred to and stored in the shift register $R_1$ through the AND gate $G_1$ and the OR gate $G''_1$. The signal stored in the shift register $R_1$ is sequentially shifted, and read out after a one-word cycle to be transferred into the next shift register $R_2$ through the AND gate $G_2$ and the OR gate $G''_2$, but the content of the shift register $R_1$ is not recirculated because the AND gate $G'_1$ is closed. In like manner, the content of the shift register $R_2$ is transferred through the AND gate $G_3$ and the OR gate $G''_3$ into the shift register $R_3$ and the content stored in the shift register $R_3$ is transferred through the AND gate $G_4$ and the OR gate $G''_4$ into the shift register $R_4$. The content of the shift register $R_4$ is then recirculated through the AND gate $G'_4$ and the OR gate $G''_4$ as long as the busy signal is applied to the AND gate $G'_4$ from the arithmetic unit 300 or printer 400. In this case the self-holding circuit $N_4$ is switched to the 1 state in response to the output signal of the AND gate $G'_4$, and in response to the output signal $n_4$ of the self-holding circuit $N_4$ the AND gate $G_4$ is closed. As a result the next key input signal from the key input section 100 is stored in the shift register $R_3$ after passing through the shift registers $R_1$ and $R_2$ and is recirculated through the gates $G'_3$ and $G''_3$. In response to the gate $G'_3$ the self-holding circuit $N_3$ outputs the signal $n_3$ so that the AND gate $G'_2$ is opened whereas the AND gate $G_3$ is closed. In like manner the key input signals are stored in the shift registers $R_2$ and $R_1$ in the order named. When all of the four shift registers $R_1 - R_4$ store the key input signals and when a further key input signal is transmitted from the key input section, an error signal indicating the abnormal condition is derived from an AND gate $Go$ to one input terminal of which is connected the $n_1$ output terminal of the self-holding circuit $N_1$.

When the "NOT BUSY" signal is transmitted from a NOT circuit $No$ after the arithmetic unit 300 or printer 400 has accomplished its operation, the AND gate $G'_4$ is closed whereas the AND gate $G_5$ is opened so that the content of the shift register $R_4$ is transferred through the AND gate $G_5$ into the arithmetic unit 300, and the self-holding circuit $N_4$ is switched to the state 0 so that the AND gate $G_4$ is opened whereas the AND gate $G'_3$ is closed. As a result the content of the shift register $R_3$ is transferred into the shift register $R_4$.

As described hereinbefore, even when the keys of the keyboard are depressed to enter data during the operation of the arithmetic unit or printer, the key input signals are stored in the shift registers $R_1 - R_4$. In other words, the data entered during the operation of the arithmetic unit or printer are not wasted. The contents of the shift registers $R_1 - R_3$ are automatically transferred to the next shift registers $R_2 - R_4$, and the content of the shift register $R_4$ is transferred into the arithmetic unit 300.

Figure 3:
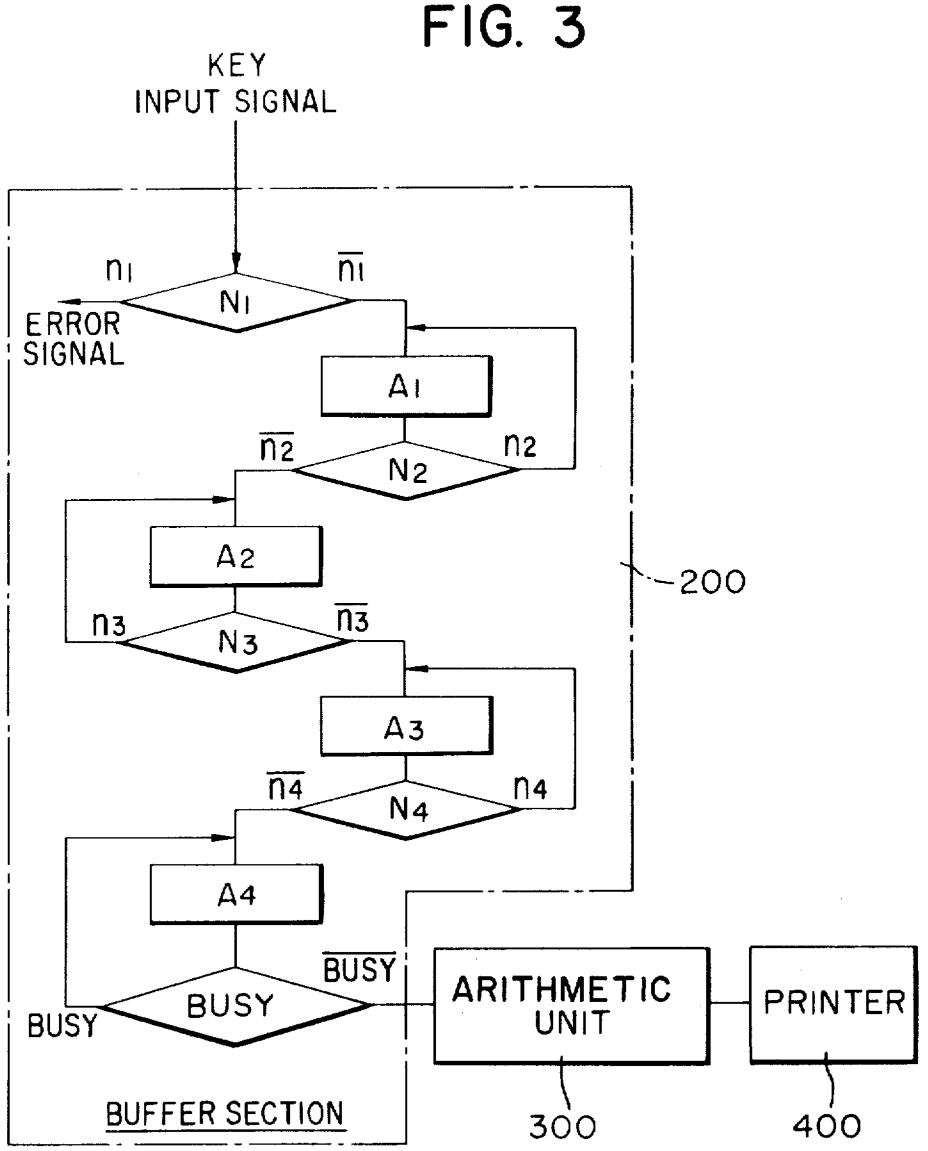
FIG. 3 is a flow chart thereof.

The mode of operation described hereinbefore is shown in a flow chart in FIG. 3.

Any number of shift registers may be used for storing the key input signals from the key input section 100, and the number of shift registers is generally dependent upon the data to be entered during the operation time of the arithmetic unit or printing time of the printer. In general four shift registers are sufficient. The dynamic operations are performed in the buffer stage, and the self-holding circuits $N_1 - N_4$ are reset in response to for example a circulation cycle of the shift registers $R_1 - R_4$.

What is claimed is:

1. A control system for transfer of input data in a table-type computer comprising:

a key input section for entering input data into the computer;

an arithmetic unit for performing arithmetic operations on said input data and for providing results of said operations;

a printer for recording results provided by the arithmetic means; and a buffer section comprising:

a. a plurality of series connected recirculating dynamic shift registers connected between said key input section and said arithmetic unit, with the first shift register of the series connected to the key input section and the 3ast shift 9egister of the series connected to the arithmetic unit;

b. a plurality of self-holding circuits connected in a one-to-one correspondence with said plurality of shift registers, each self-holding circuit providing a first output signal while input data are stored in its corresponding shift register and a second input signal while its corresponding shift register is empty; and c. control means including a plurality of gate means interposed between the key input section and the first register, between adjacent registers, and between the self-holding circuits and the registers, said control means responsive to said first and second output signals from the self-holding circuits to control said gate means to transfer input data from the key input section into the first register only when said first register is empty, and to transfer input data from each register into the succeeding register in the series when said succeeding register is empty but to recirculate the data in each register whose succeeding register is not empty.

2. A control system as in claim 1 wherein the arithmetic unit and the printer are interconnected and at least one of said arithmetic unit and printer has means for providing a busy signal, and the control means includes gate means interposed between the last register and the arithmetic unit and is responsive to said busy signal to prevent the transfer of data from the last register into the arithmetic section for the duration of said busy signal.

3. A control system as in claim 2 wherein said busy signal is provided only while the printer is in the process of recording said results.

4. A control system as in claim 1 including means connected to the self-holding circuit associated with the first shift register and to the key entry section for providing an error signal when all shift registers, including the first shift register, are storing input data and the key input section provides data for entry into the first register.

5. A control system as in claim 1 wherein each of said plurality of said self-holding circuits comprises a flip-flop which is set when input data are stored in its corresponding shift register and is reset when no input data are stored in its corresponding shift register.

6. A control system for transfer of input data in a table-type computer comprising:

a key input section for entering input data into the computer;

an arithmetic unit for performing arithmetic operations on said input data and for providing results thereof;

a printer for recording said results;

means for providing a busy signal while selected operations of at least one of said arithmetic unit and printer are taking place and a not busy signal while said selected operations are not taking place; and a buffer section comprising:

a. a plurality of series connected circulating dynamic shift registers connected between said key input section and said arithmetic unit;

b. a plurality of self-holding circuits connected in a one-to-one correspondence with said plurality of shift registers, each self-holding circuit providing a first output signal when input data are stored in its corresponding shift register and providing a second output signal when no input data are stored in its corresponding shift register; and c. control means including a plurality of first gates connected in a one-to-one correspondence with each shift register and each self-holding circuit, each of said first gates allowing the storing of input data in its shift register only when the corresponding self-holding circuit is providing the second output signal, a plurality of second gates connected in a one-to-one correspondence to each shift register and each self-holding circuit, each of said second gates causing the recirculation of the input data in its shift register when the corresponding self-holding circuit is providing said first output signal, and a third gate interconnected between the last shift register of the series and the arithmetic unit and connected to the means for providing said busy and not busy signal to allow transfer of input data from the last shift register to the arithmetic unit only when the not busy signal is being provided.

7. A control system as in claim 6 including a fourth gate connected to the key entry section and to the self-holding circuit corresponding to the first shift register to provide an error signal when input data is provided from the key entry section while the last recited self-holding circuit is providing said first output signal.

8. A control system as in claim 6 wherein the busy signal is provided only while the printer is in the process of recording the results provided thereto from the arithmetic unit.

* * * * *

UNITED STATES PATENT OFFICE

CERTIFICATE OF CORRECTION

Patent No. 3,858,799 Dated January 7, 1975

Inventor(s) Yoshio Ozawa et al.

It is certified that error appears in the above-identified patent and that said Letters Patent are hereby corrected as shown below:

Column 4, line 33, change "3ast" to read -- last --;

Column 4, line 33, change "9egister" to read -- register --.

Signed and sealed this 13th day of March 1975.

(SEAL)
Attest:

RUTH C. MASON
Attesting Officer

C. MARSHALL DANN
Commissioner of Patents
and Trademarks